(12) United States Patent
Powell et al.

(10) Patent No.: US 7,305,893 B2
(45) Date of Patent: Dec. 11, 2007

(54) OSCILLATING VANE ACTUATOR APPARATUS AND METHOD FOR ACTIVE FLOW CONTROL

(75) Inventors: Arthur Gregory Powell, Huntington Beach, CA (US); Jay Robert Simmons, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/594,122

(22) Filed: Nov. 8, 2006

(65) Prior Publication Data

US 2007/0084297 A1 Apr. 19, 2007

Related U.S. Application Data

(63) Continuation-in-part of application No. 11/498,090, filed on Aug. 3, 2006, now Pat. No. 7,246,529, which is a continuation of application No. 11/201,387, filed on Aug. 11, 2005, now Pat. No. 7,104,143.

(51) Int. Cl.
*G01F 1/28* (2006.01)

(52) U.S. Cl. .................................. 73/861.74

(58) Field of Classification Search .......... 73/861.74, 73/866.05, 861.79, 861.87, 861.75, 861; 244/208
See application file for complete search history.

(56) References Cited

U.S. PATENT DOCUMENTS

| | | | |
|---|---|---|---|
| 4,907,456 A | 3/1990 | Rozelle | |
| 5,099,699 A | 3/1992 | Kobold | |
| 6,079,280 A | 6/2000 | Miller et al. | |
| 6,866,234 B1 | 3/2005 | Hassan et al. | |
| 6,899,302 B1 | 5/2005 | Hassan et al. | |
| 7,104,143 B1 * | 9/2006 | Powell | 73/861.74 |

* cited by examiner

*Primary Examiner*—Jewel Thompson
(74) *Attorney, Agent, or Firm*—Baker & Hostetler LLP

(57) ABSTRACT

An oscillating vane actuator for active control of fluid flow over a surface includes a pivoted vane surrounded by a wedge-shaped chamber, and first and second conduits with openings adjacent the surface. The actuator also includes a rotating shaft with a connecting rod to actuate the vane in a oscillatory manner. As the vane travels in one direction, fluid is forced out from the chamber through the first conduit and opening into the fluid stream adjacent the surface, while fluid is simultaneously drawn in through the second opening and conduit into the opposite side of the chamber. Similarly, when the vane travels in the opposite direction, fluid is forced out through the second conduit and opening into the fluid stream adjacent the surface, while fluid is simultaneously drawn in through the first opening and conduit.

39 Claims, 7 Drawing Sheets

OSCILLATING VANE ACTUATOR APPARATUS AND METHOD FOR ACTIVE FLOW CONTROL

CROSS REFERENCE TO RELATED APPLICATIONS

This application is a Continuation-in-Part of and claims priority to U.S. patent application Ser. No. 11/498,090, filed on Aug. 3, 2006, now U.S. Pat. No. 7,246,529 titled "OSCILLATING VANE ACTUATOR APPARATUS AND METHOD FOR ACTIVE FLOW CONTROL," which is a Continuation of and claims priority to U.S. patent application Ser. No. 11/201,387, filed on Aug. 11, 2005, now issued as U.S. Pat. No. 7,104,143, titled "OSCILLATING VANE ACTUATOR APPARATUS AND METHOD FOR ACTIVE FLOW CONTROL," the disclosures of which are incorporated herein by reference in their entireties.

FIELD OF THE INVENTION

The present invention relates generally to flow control actuation. More particularly, the present invention relates to an actuation apparatus and method to provide active flow control of flow over a surface.

BACKGROUND OF THE INVENTION

Fluid flow separation can occur when a compressible or incompressible fluid flows over a surface, in particular a convex curved surface, such as an interior surface of a fluid conduit or an exterior surface of a body immersed in a fluid. Flow separation can occur under laminar or turbulent flow conditions, depending upon the boundary layer fluid flow characteristics and the geometry of the surface. It is often desirable to inhibit flow separation in order to reduce form drag or in order to increase aerodynamic lift. In general, the farther along a curved surface that a fluid travels before separation, the better the resulting form drag and aerodynamic lift.

In the case of aerodynamic surfaces, the aerodynamic performance or efficiency of a particular surface, for example an airfoil, such as an airplane wing, rotor blade, turbine or compressor blade, windmill, fan or propeller blade, is strongly dependent on the lift force generated by the airfoil. To this end, active flow control (AFC) techniques have been utilized to increase the lift of airfoils by inhibiting or delaying separation of the fluid flow over the aerodynamic surface.

Active flow control techniques include providing ports or openings in the surface of an airfoil, and providing steady air flow into or out from the ports or openings, or unsteady (e.g., alternating) fluid flow into and out from the ports and openings. Active flow control techniques have proven to be effective in increasing the lift coefficient of airfoils, decreasing the drag coefficient, or both, thereby increasing the aerodynamic performance or efficiency of the airfoil.

Active flow control techniques are particularly advantageous under conditions where large flow separation over an aerodynamic surface would otherwise exist. Such conditions are common at airfoil leading-edge slats and trailing-edge flaps during periods during which high lift is generated.

The high lift auxiliary surfaces, such as leading-edge slats or trailing-edge flaps, are required primarily during relatively slow-speed flight, or during take-off and landing. The potential lift performance generally is not reached and a drag penalty generally occurs during the deployment of leading-edge slats or trailing-edge flaps due to the creation of localized flow separation regions. The size of these flow separation regions depends on factors such as the free stream angle of attack, the relative flow velocity of the fluid stream with respect to the aerodynamic surface, the airfoil chord lines, geometry and the deflection angle of the leading-edge slats or the trailing-edge flaps.

By reducing or inhibiting flow separation, a corresponding increase in lift and reduction in drag can be achieved. Active flow control methods can reduce or inhibit flow separation, for example, by introducing relatively high-velocity fluid flow into the fluid stream immediately above the aerodynamic surface in order to increase the kinetic energy of the fluid stream boundary layer, thereby maintaining attachment of the boundary layer farther along the surface. Similarly, removing relatively low-velocity fluid from the flow stream adjacent the aerodynamic surface can result in a net increase of the kinetic energy of the flow stream boundary layer and help to reduce or inhibit flow separation. However, some existing active flow control methods and devices can be prohibitively fragile or heavy, and can have limited power capacity.

Accordingly, it is desirable to provide a method and apparatus that provides active flow control and is robust against physical damage, lightweight, and has a relatively high power capacity.

SUMMARY OF THE INVENTION

The foregoing needs are met, to a great extent, by the present invention, wherein in one aspect an apparatus is provided that in some embodiments provides actuation of unsteady active flow control using a robust oscillating vane that is less susceptible to physical damage, is relatively lightweight and has a higher power capacity in comparison with some existing active flow control actuators.

An embodiment of the present invention pertains to an actuator for displacing a fluid to alter flow characteristics near a surface. The actuator includes a pivot, plurality of vanes, casing, plurality of walls, first orifice, and second orifice. Each vane of the plurality of vanes extends outwardly from the pivot. The plurality of vanes is substantially in balance with respect to the pivot. The plurality of vanes is configured to displace the fluid. A first vane of the plurality of vanes has a first face and a second face. The casing is configured to at least partially surround the plurality of vanes. The plurality of walls extends inwardly from the casing towards the pivot. A first wall of the plurality of walls faces the first face. A second wall of the plurality of walls faces the second face. The first orifice opens into the casing between the first wall and the first face. The second orifice opens into the casing between the second wall and the second face. The fluid is expelled from the first orifice and drawn into the second orifice in response to the first vane moving toward the first wall and the fluid is drawn into the first orifice and expelled from the second orifice in response to the first vane moving toward the second wall.

Another embodiment of the present invention relates to an actuator for displacing a fluid to alter flow characteristics near a surface. The actuator includes a cylindrical casing, wall, pair of ports, and plurality of vanes. The cylindrical casing has a central axis. The wall extends radially inwardly from the cylindrical casing towards the central axis. The pair of ports flanks respective sides of the wall. Each of the ports provides a fluid path through the cylindrical casing. The plurality of vanes extends radially outwardly from the central axis towards the cylindrical casing. The fluid is urged to flow in to the cylindrical casing through a first port of the pair of ports and the fluid is urged to flow out of the cylindrical casing through a second port of the pair of ports in response to rotating the plurality of vanes in a first direction.

Yet another embodiment of the present invention pertains to an apparatus for displacing a fluid to alter flow characteristics near a surface. The apparatus includes a means for displacing the fluid using a plurality of vanes rotating about a central shaft in a cylindrical casing configured to at least partially surround the vane, means for conveying the fluid out from a first side of the casing and expelling the fluid into a fluid stream adjacent the surface in response to rotation of the shaft in a first direction, and means for drawing the fluid from the fluid stream and conveying the fluid into the first side of the casing in response to rotation of the shaft in a second direction.

Yet another embodiment of the present invention relates to an apparatus for displacing a fluid to alter flow characteristics of a fluid stream near a surface. The apparatus includes a means for rotating a plurality of vanes about a shaft in a cylindrical casing. The casing includes a first side and a second side. The first side is in fluid connection with a first orifice. The second side is in fluid connection with a second orifice. The first orifice and the second orifice are in fluid connection with the fluid stream. In addition, the apparatus include a means for drawing the fluid from the fluid stream via the first orifice and expelling the fluid into the fluid stream via the second orifice in response to rotating the shaft in a first direction and means for expelling the fluid into the fluid stream via the first orifice and drawing the fluid from the fluid stream via the second orifice in response to rotating the shaft in a second direction.

Yet another embodiment of the present invention pertains to a method of displacing a fluid to alter flow characteristics near a surface. In this method, the fluid is displaced using a plurality of vanes rotating about a central shaft in a cylindrical casing configured to at least partially surround the vane, the fluid is conveyed out from a first side of the casing and expelling the fluid into a fluid stream adjacent the surface in response to rotation of the shaft in a first direction, and the fluid is drawn from the fluid stream and conveying the fluid into the first side of the casing in response to rotation of the shaft in a second direction.

Yet another embodiment of the present invention relates to a method of displacing a fluid to alter flow characteristics of a fluid stream near a surface. In this method a plurality of vanes is rotated about a shaft in a cylindrical casing. The casing includes a first side and a second side. The first side is in fluid connection with a first orifice. The second side is in fluid connection with a second orifice. The first orifice and the second orifice are in fluid connection with the fluid stream. Additionally in the method, the fluid is drawn from the fluid stream via the first orifice and expelling the fluid into the fluid stream via the second orifice in response to rotating the shaft in a first direction and the fluid is expelled into the fluid stream via the first orifice and drawing the fluid from the fluid stream via the second orifice in response to rotating the shaft in a second direction.

Yet another embodiment of the present invention pertains to a method of displacing a fluid to alter flow characteristics of a fluid stream near a surface. In this method, a plurality of vanes rotationally oscillate about a shaft in a cylindrical casing. The casing includes a first side and a second side. The first side is in fluid connection with a first orifice. The second side is in fluid connection with a second orifice. The first orifice and the second orifice are in fluid connection with the fluid stream. In addition, the fluid is drawn from the fluid stream via the first orifice and expelled into the fluid stream via the second orifice in response to rotating the shaft in a first direction. Furthermore, the fluid is expelled into the fluid stream via the first orifice and drawn from the fluid stream via the second orifice in response to rotating the shaft in a second direction.

Yet another embodiment of the present invention relates to an actuator for displacing a fluid to alter flow characteristics near a surface. The actuator including a vane, casing, and first orifice. The vane is configured to displace the fluid. The vane has a first face and a second face. The casing is configured to at least partially surround the vane. The casing has a first side toward the first face of the vane. The first orifice opens into the casing from the first side of the casing. The fluid is expelled from the first orifice when the first face of the vane travels toward the first side of the casing, and the fluid is drawn into the first orifice when the first face of the vane travels away from the first side of the casing.

Yet another embodiment of the present invention pertains to an actuator for displacing a fluid to alter flow characteristics near a surface. The actuator includes a displacing means, casing means and porting means. The displacing means displaces the fluid. The casing means at least partially surrounds the displacing means. The casing means has a first side. The porting means intakes and outputs the fluid to the first side of the surrounding means. The fluid is expelled from the casing means via the porting means in response to the displacing means being urged toward the first side of the casing means and the fluid is drawn into the casing means via the porting means in response to the displacing means being urged away from the first side of the casing means.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

An embodiment in accordance with the present invention provides an oscillating vane actuator that can provide active flow control of a fluid stream passing over an aerodynamic surface, which may be planar, curved or contoured. The oscillating vane actuator can include a vane, a wedge-shaped chamber surrounding the vane, a first conduit with an opening adjacent the surface, a second conduit with another opening adjacent the surface, a rotating shaft and a connecting rod. The openings open into a fluid stream flowing with a velocity relative to the aerodynamic surface. The rotating shaft provides a motive force by way of the connecting rod to move the vane back and forth in an arc about a pivot within the wedge-shaped chamber.

When the vane travels in one direction, fluid is forced out from the chamber through the first conduit on one side of the wedge-shaped chamber, and fluid is drawn into the chamber through the second conduit on the opposite side of the wedge-shaped chamber. When the vane travels in the opposite direction, fluid is forced out of the chamber through the second conduit, and fluid is drawn into the chamber from the first conduit.

Figure 1:
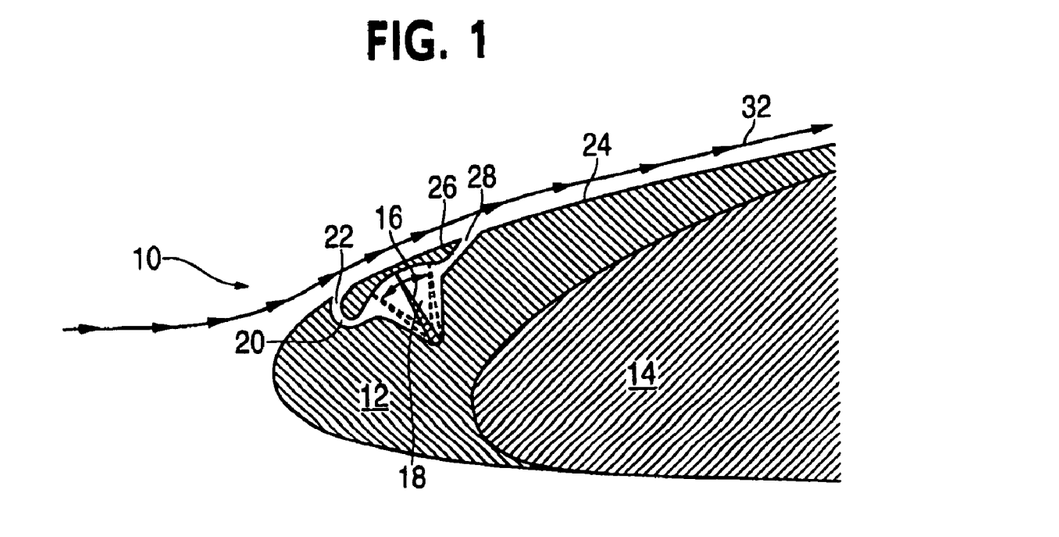
FIG. 1 is a cross-section view illustrating an oscillating vane actuator according to a preferred embodiment of the invention that can provide active flow control to reduce flow separation in a fluid stream flowing over a leading-edge slat of an airfoil.

The invention will now be described with reference to the drawing figures, in which like reference numerals refer to like parts throughout. An embodiment is shown in FIG. 1, which illustrates a dual-ported oscillating vane actuator 10 located within a leading-edge slat 12 of an airfoil 14, such as a main wing of an airplane. (Although depicted as solid objects in FIG. 1, the slat 12 and the airfoil 14 can have any suitable internal structure.) The oscillating vane actuator 10 can include a vane 16 that travels back and forth inside of a wedge-shaped chamber 18. The actuator 10 can also include a first conduit 20 that leads from the chamber 18 to a first opening 22, or port, adjacent the aerodynamic surface 24. The actuator 10 further can include a second conduit 26 that leads from the opposite side of the chamber 18 to a second opening 28 adjacent the aerodynamic surface 24. In various embodiments, the first and second openings 22, 28 may be formed by the aerodynamic surface, or may be separate but adjacent to the aerodynamic surface 24.

Figure 2:
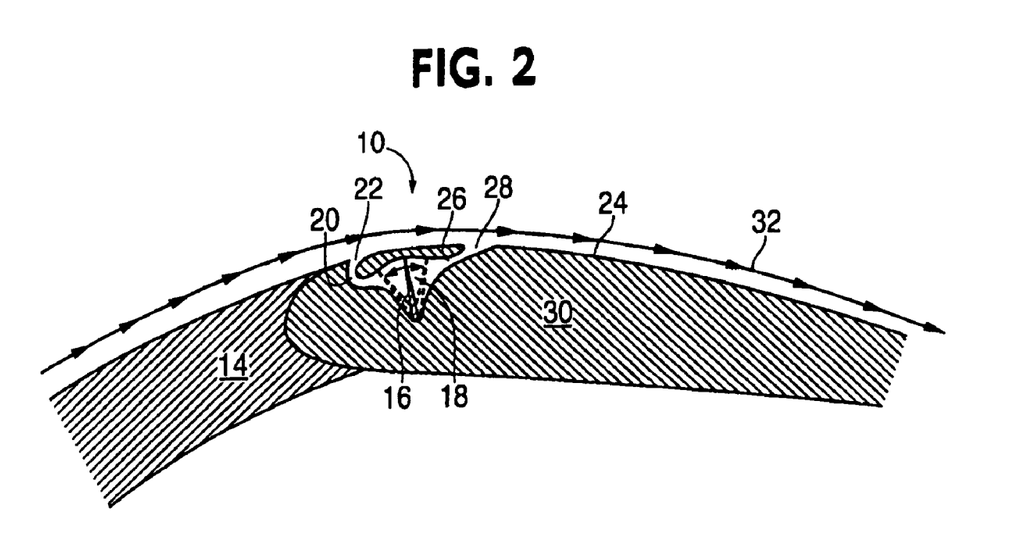
FIG. 2 is a cross-section view of an oscillating vane actuator according to another preferred embodiment of the invention that can provide active flow control to reduce flow separation in a fluid stream flowing over a trailing-edge flap of an airfoil.

An alternative embodiment of the invention is shown in FIG. 2, which illustrates a dual-ported oscillating vane actuator 10 that is located within a trailing-edge flap 30 of an airfoil 14, such as an airplane wing. (Once again, although depicted as solid objects in FIG. 2, the airfoil 14 and the flap 30 can have any suitable internal structure.) In this embodiment also, the actuator 10 can include a vane 16 inside a chamber 18. The actuator 10 further can include a first conduit 20 that leads from the chamber 18 to an opening 22 adjacent the aerodynamic surface 24 of the flap 30. Likewise, the actuator 10 can include a second conduit 26 that leads from the chamber 18 to a second opening 28 adjacent the aerodynamic surface 24.

Additional embodiments of the oscillating vane actuator 10 can be used to reduce or inhibit flow separation on any surface over which a fluid stream flows, for example, curved interior surfaces of ducts or conduits, exterior surfaces of aquatic vehicles, fuselage surfaces on airplanes and other aircraft, etc.

In operation, the oscillating vane actuators 10 in both embodiments shown in FIG. 1 and FIG. 2, can provide unsteady active flow control to reduce or inhibit flow separation of a fluid stream 32 flowing with a velocity relative to the aerodynamic surface 24. When the vane 16 travels toward the left as indicated by the arrows in FIG. 1 or FIG. 2, fluid is forced out of the chamber 18 through the first conduit 20 and out of the first opening 22 into the fluid stream 32 passing over the aerodynamic surface 24, and fluid is simultaneously drawn into the chamber 18 by way of the second opening 28 and the second conduit 26. Similarly, when the vane 16 travels toward the right as indicated in FIG. 1 or FIG. 2, fluid is forced out of the chamber 18 through the second conduit 26 and out of the second opening 28 into the fluid stream 32 passing over the aerodynamic surface 24, and fluid is simultaneously drawn into the chamber 18 by way of the first opening 22 and the first conduit 20.

In various embodiments, the openings 22, 28 can include any geometric cross-section, for example, a round opening, an elliptical opening, a square opening, or an elongated slot. A preferred embodiment of the invention includes two elongated openings 22, 28 that are relatively long in a direction along the width of an airfoil (in a normal direction into the page in FIG. 1) and are relatively thin in a direction along the chord of the aerodynamic surface 24. In a particular application, the length and dimensions of the first and second openings 22, 28 can be determined by the structure of the wing or other aerodynamic surface 24.

In addition, both the first opening 22 and the second opening 28 can be directed in the direction that the flow stream 32 is moving with respect to the aerodynamic surface 24, as shown in both FIG. 1 and FIG. 2. Thus, when air is forced out from the first opening 22 or the second opening 28, the augmented air flow ejected from the chamber 18 is introduced into the flow stream 32 moving in the direction of the flow stream 32 at a higher relative velocity with respect to the aerodynamic surface 24 than that of the boundary layer of the flow stream 32 immediately adjacent the aerodynamic surface 24.

Furthermore, in a preferred embodiment the first and second openings 22, 28 can be located near a point of potential flow separation along the chord of the aerodynamic surface in order to improve the velocity profile of the boundary layer of the adjacent flow stream 32. For example, although the oscillating vane actuators 10 shown in FIG. 1 and FIG. 2 are located near the leading-edge of the slat 12 in FIG. 1 and the flap 30 in FIG. 2, in other embodiments the oscillating vane actuator 10 and more specifically, the first and second openings 22, 28, can be relocated at any point along the aerodynamic surface 24 near which flow separation can occur, such as at a location two-thirds of the length of the chord from the leading edge.

Figure 3:
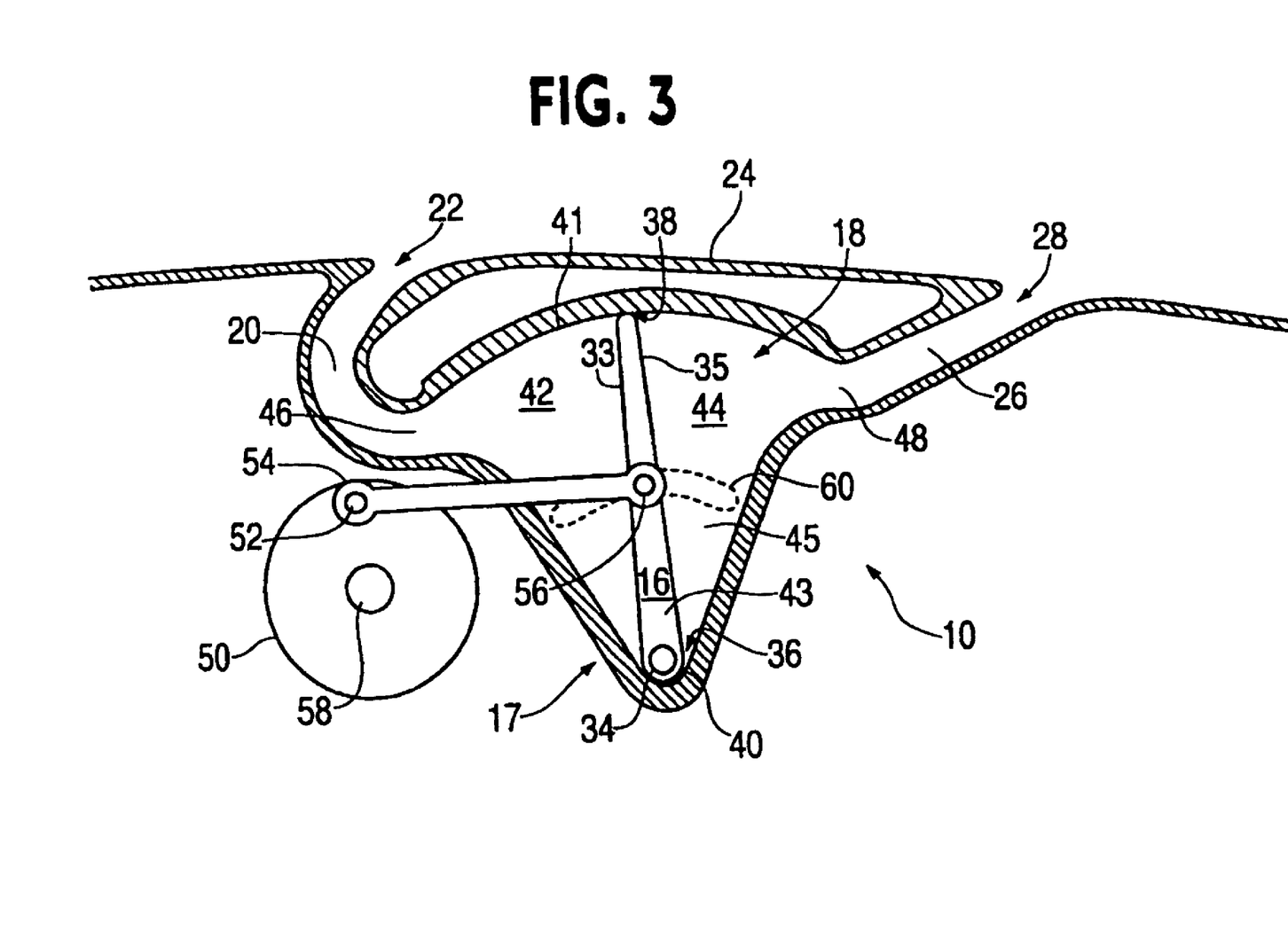
FIG. 3 is a cross-section detail view of a dual-ported oscillating vane actuator that can be used in the embodiments of FIG. 1 and FIG. 2.

FIG. 3 shows a more detailed illustration of an embodiment of the dual-ported oscillating vane actuator 10. The actuator 10 can include a vane 16 having a first face 33 and a second face 35; a radius (or length) from a proximal end 36 of the vane 16 to a distal end 38 of the vane 38; a thickness, which can be tapered from the proximal end 36 of the vane 16 to the distal end 38 of the vane 16, or alternatively can be constant; and a width (into the page in FIG. 3), which can vary according to the needs of a particular application, as well as to accommodate the structure of the wing or other aerodynamic surface 24.

The vane 16 can be surrounded, at least in part, by a casing 17 that defines an internal wedge-shaped chamber 18, such that the vane 16 can travel back and forth (left and right in FIG. 3) inside the chamber 18. The chamber 18 is defined by the contour of the interior walls 40 of the casing 17, including a distal wall 41 that can be curved to match the radius of the vane 16. The proximal end of the vane 16 can be rounded, as shown in FIG. 3, and the distal end of the vane 16 can be curved to match the corresponding interior walls 40 of the casing 17. In a preferred embodiment, the casing 17 and the vane 16 can be designed so that the vane 16 has a minimal clearance at its proximal end 36 and at its distal end 38 with respect to the interior walls 40 of the casing 17, as the vane oscillates. Likewise, the edges 43 of the vane 16 facing into and out from the page in FIG. 3 can have a minimal clearance with the corresponding ends 45 of the casing 17, as the vane oscillates. (Only one of two edges 43 and one of two ends 45 are shown in FIG. 3, because the edge 43 facing into the page is not visible in this view and the near end 43 has been cut away in the cross section view of FIG. 3.) Therefore, a perimeter around the proximal end 36, the distal end 38, and the edges 45 of the vane 16 can have a substantially fluid-tight clearance with the walls 40 of the casing 17. Thus, fluid leakage around the perimeter of the vane 16 can have only an insignificant effect on the efficiency of the actuator 10, and lubrication is not required for the vane 16.

In addition, the vane 16 can be coupled by any suitable means to a pivot 34, for example, at a location near the proximal end 36 of the vane 16, as shown in FIG. 3. The pivot 34 can be fixedly attached to the casing 17, and the vane 16 can be rotationally attached to the pivot 34. Alternatively, the vane 16 can be fixedly attached to the pivot 34 and the pivot 34 can be rotationally attached to the casing 17 defining the chamber 18. In either case, the pivot 34 can be attached to the casing 17 at one or both ends 45 of the casing 17, or at one or more intermediate points along the walls 40 of the casing 17.

Furthermore, the actuator 10 can include a first conduit 20 that leads from a first side 42 of the chamber 18 to a first opening 22, or port, adjacent the aerodynamic surface 24. The actuator 10 further can include a second conduit 26 that leads from a second side 44 of the chamber 18 to a second opening 28, or port, adjacent the aerodynamic surface 24. In a preferred embodiment of the invention, the first conduit 20 and the second conduit 26 can be tapered from a chamber end 46, 48, or orifice, to the respective openings 22, 28 such that the velocity of the fluid flowing out from the chamber 18 through the first conduit 20 or the second conduit 26 can increase in velocity as it travels from the chamber 18 to the respective opening 22, 28 adjacent the aerodynamic surface 24. In this case, fluid being drawn through the first opening 22 or the second opening 28 can be diffused as it travels through the respective first conduit 20 or the second conduit 26.

The inertial loads upon and stresses in the vane 16 increase with the frequency or periodicity of the oscillatory motion of the vane 16. The radius (or length) of the vane 16, the angle of the wedge-shaped chamber 18, and the frequency at which the vane 16 is oscillated can be determined according to the requirements of a particular application. Thus, a preferred embodiment of the oscillating vane actuator 10 can include a vane 16 of, for example, approximately three to six inches radius (or length) and a chamber with a side-to-side angle of approximately 60 degrees, and can be operated, for example, at a frequency below 20 Hertz. The clearance between the distal end 38 of the vane 16 and the distal wall 41 of the casing 17, the clearance between the proximal end 36 of the vane 16 and the corresponding wall 40 of the casing 17, or the clearance between the vane 16 and the ends 45 of the casing can be minimal, for example, between approximately 0.001 inch and approximately 0.025 inch.

Furthermore, a preferred embodiment can include a conduit taper of, for example, approximately six degrees from the chamber to the openings 20, 28 of the first and second conduits 20, 26. For example, a chamber end 46, 48, or orifice, of the first and second conduits 20, 26 can have a diameter (or thickness) of approximately 0.5 inch, and the openings 22, 28 can have a diameter (or thickness) of approximately 0.25 inch or less, depending in part on the length of the conduits 20, 26. In addition, the openings 22, 28 can form an angle of approximately 20 degrees with the aerodynamic surface 24. Nevertheless, the geometry of the first and second conduits 20, 26 can be varied in accordance with the design requirements of a particular application of the oscillating vane actuator 10. As will be understood by one of ordinary skill in the art, the design factors regarding the specific size and shape of the vane 16, the casing 17, the conduits 20, 26 and the openings 22, 28 can vary between particular applications of the oscillating vane actuator 10.

Moreover, the actuator 10 can include a rotating shaft 50 with a crank 52 connected to a connecting rod 54, which also can be connected to the vane 16, for example, by a shaft 56 at an offset distance from the pivot 34. The connections at the crank 52 and the shaft 56 can include a bearing surface to reduce friction, such as a roller bearing, ball bearing, or the like, as well as lubrication. In addition, sealed bearings can be used at the connections of the connecting rod 54 to the crank 52 and to the shaft 56, and the connections of the pivot 34 to the casing 17, or of the vane 16 to the pivot 34, such that maintenance lubrication is not required for the entire oscillating actuator 10. The crank 52 can be offset from the central axis 58 of the rotating shaft 50, so that as the rotating shaft 50 rotates, the vane 16 is actuated back and forth (left and right in FIG. 3) in an oscillatory motion inside the chamber 18.

In this configuration, an end 45 (which has been cut away in the cross-section of FIG. 3) of the casing 17 that defines the wedge-shaped chamber 18 can include a slot 60 (represented by the dashed line in FIG. 3) through which a connecting mechanism, such as a shaft 56, can pass in order to couple with the connecting rod 54. The slot 60 can be curved, as shown in FIG. 3, to correspond to the travel path of the shaft 56. In addition, the curved slot 60 can be sealed in an fluid-tight fashion, for example, using a sliding seal or any other suitable sealing means.

Thus, as the vane 16 travels in a direction toward the first side 42 of the chamber 18 (to the left in FIG. 3), fluid can be displaced from the first side 42 of the chamber 18 through the first conduit 20 and out through the first opening 22 adjacent the aerodynamic surface 24. Similarly, as the vane 16 travels in the opposite direction toward the second side 44 of the chamber 18 (to the right in FIG. 3), fluid can be displaced from the second side 44 of the chamber 18 through the second conduit 26 and out through the second opening 28 adjacent the aerodynamic surface 24. Simultaneously, as the vane 16 travels toward in the direction toward the first side 42 of the chamber 18 (to the left in FIG. 3), fluid is drawn in through the second opening 28 and the second conduit 26 into the second side 44 of the chamber 18. Likewise, when the vane 16 travels in the opposite direction toward the opposite side 44 of the chamber 18 (to the right in FIG. 3), fluid is drawn in through the first opening 22 adjacent the aerodynamic surface 24, through the first conduit 20 and into the first side 42 of the chamber 18.

In this manner, at any given time during the operation of the oscillating vane actuator 10, fluid may be simultaneously forced out through one of either the first opening 22 or the second opening 28, and drawn into the opposite of the first opening 22 and the second opening 28 adjacent the aerodynamic surface 24, thereby providing unsteady air flow control of the boundary layer of the fluid stream flowing adjacent the aerodynamic surface 24.

In an alternative embodiment, the connecting rod 54 can be connected to a linkage arm 66 (shown in FIG. 5) that is coupled to an extension of the pivot 34 external to the chamber 18. In another alternative embodiment, the rotating shaft 50 can be connected to the pivot 34 in order to directly provide a rotational motive force to drive the vane 16 in an oscillatory motion inside the wedge-shaped chamber 18. In this latter embodiment, the connecting rod 54 and the shaft 56 can be omitted, and the curved slot 60 in the end 45 of the casing 17 is not required.

In various embodiments, the rotating shaft 50 can be driven by any source of rotational power, such as an electric motor, a servo motor, a hydraulic or pneumatic actuator, or any of numerous suitable rotational actuators. Moreover, the rotating shaft 50, and any mechanism associated with the rotational actuator, can provide inertial momentum to aid in continuous actuation of the vane 16.

Figure 4:
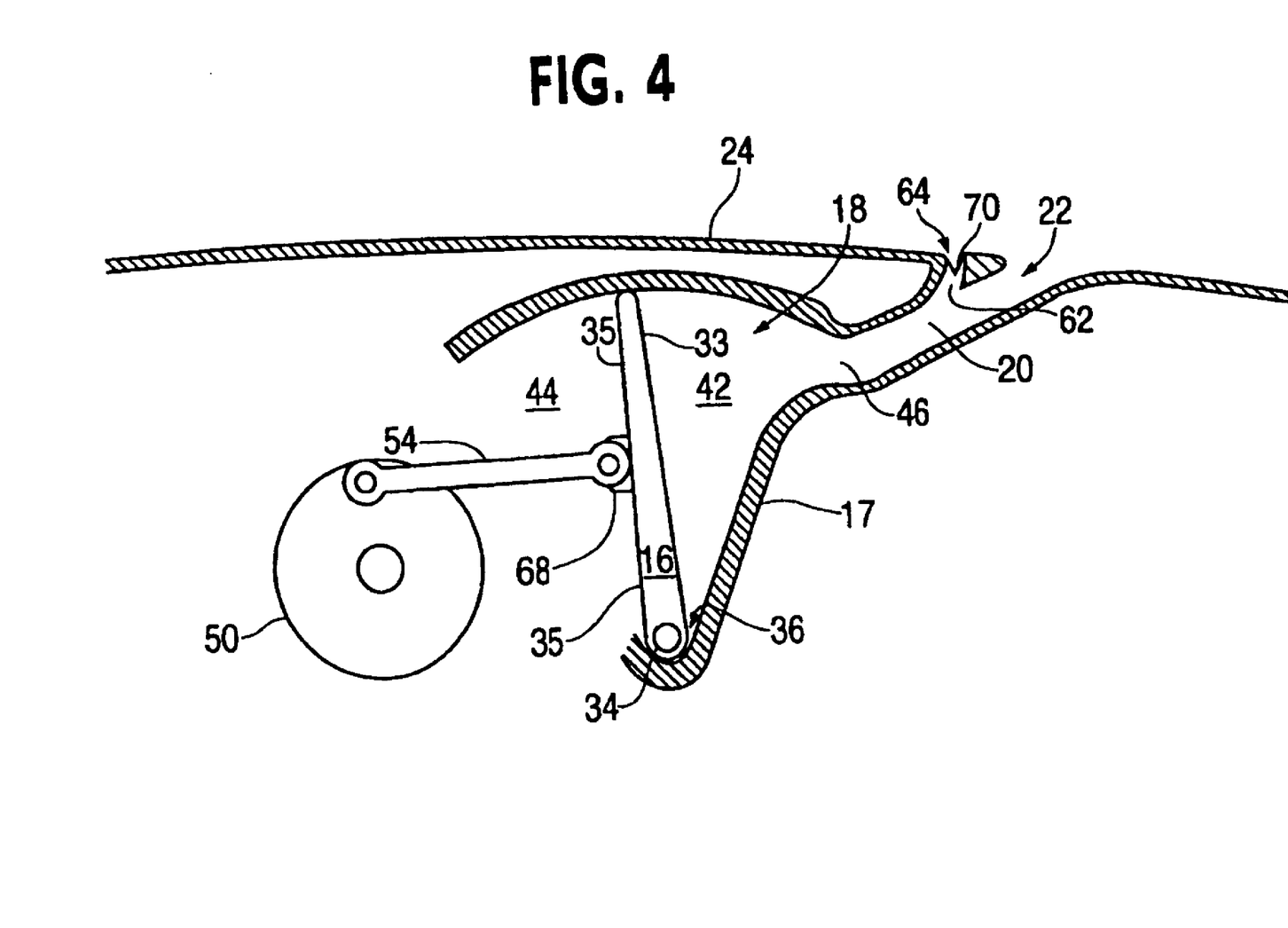
FIG. 4 is a cross-section detail view of a single-ported oscillating vane actuator that can be used in the embodiments of FIG. 1 and FIG. 2.

An alternative embodiment of the invention is shown in FIG. 4, which illustrates a single-ported oscillating vane actuator 10. In this embodiment also, the oscillating vane actuator 10 can include a vane 16 coupled to a pivot 34 near a proximal end 36 of the vane 16, such that the vane 16 can travel back and forth inside of a wedge-shaped chamber 18 inside a casing 17. The actuator 10 can include a first conduit 20 that leads from the chamber 18 to a first opening 22, or port, adjacent the aerodynamic surface 24. As in the previous embodiments, the first conduit 20 can form an angle with the aerodynamic surface 24 near the first opening 22, and may be tapered from a chamber end 46 to the first opening 22. However, in this embodiment, the second side 44 of the casing opposite the first conduit 20 may be open to the atmosphere, as shown in FIG. 4. In addition, the connecting rod 54 may be coupled to a lug 68 that can be attached to the second face 35 of the vane 16. Alternatively, the connecting rod 54 may be coupled to the vane as described in the previous embodiments.

Thus, when the vane 16 travels in a direction toward the first side 42 of the chamber 18 (to the right in FIG. 4), fluid can be displaced from the first side 42 of the chamber 18 through the first conduit 20 and out through the first opening 22 adjacent the aerodynamic surface 24. When the vane 16 travels in the opposite direction toward the second side 44 of the chamber 18 (to the left in FIG. 4), fluid can be drawn in through the first opening 22 adjacent the aerodynamic surface 24, through the first conduit 20 and into the first side 42 of the chamber 18.

In addition, the actuator 10 optionally can include an intake conduit 62 that branches off from the first conduit 20 and leads to an intake opening 64 adjacent the aerodynamic surface 24. The intake conduit 62 can be approximately normal, or perpendicular, to the aerodynamic surface 24 near the intake opening 64, in order to facilitate entry of fluid adjacent the aerodynamic surface 24. In a preferred embodiment, the intake opening 64 can be located upstream of the first opening 22 in a relatively lower pressure ambient compared to that of the first opening 22. Thus, when the vane 16 travels in a direction toward the first side 42 of the chamber 18 (to the right in FIG. 4), fluid can be displaced from the first side 42 of the chamber 18 through the first conduit 20 and primarily out through the first opening 22 adjacent the aerodynamic surface 24. In order to prevent or minimize fluid flow out through the intake conduit 62 and the intake opening 64, a one-way valve 70, such as a reed valve, can be installed in the intake conduit 62. The one-way valve 70 can allow flow into the intake opening, but prevent or minimize flow out of the intake opening 64.

Thus, when the actuator 10 is configured with the optional intake conduit 64, as the vane 16 travels in the opposite direction toward the second side 44 of the chamber 18 (to the left in FIG. 4), fluid can be drawn in primarily through the intake opening 64, and then can travel through the intake conduit 62 and a portion of the first conduit 20 to reach the first side 42 of the chamber 18. In addition, some fluid may be simultaneously drawn in through the first opening 22 adjacent the aerodynamic surface 24, through the first conduit 20 and into the second side 44 of the chamber 18.

Figure 5:
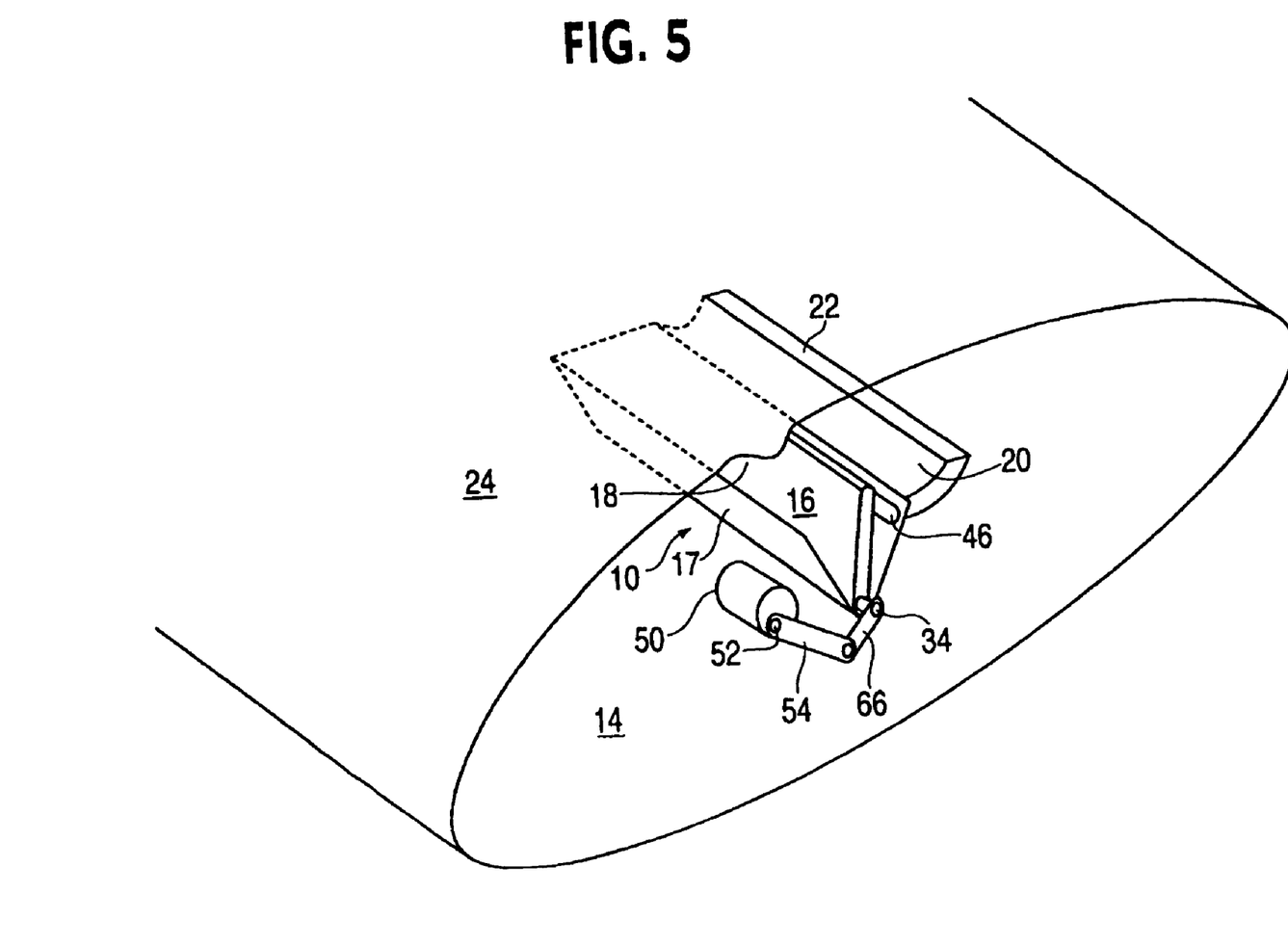
FIG. 5 is a partially cutaway perspective view of a single-ported oscillating vane actuator installed in an airfoil.

In FIG. 5, a perspective view of a single-ported oscillating vane actuator 10 is shown installed in an airfoil 14, such as an airplane wing. As described above, the oscillating vane actuator 10 can include a vane 16 coupled to a pivot 34, such that the vane 16 can travel back and forth inside of a wedge-shaped chamber 18 of a casing 17. In FIG. 5 the casing 17 is shown partially cut away to reveal the vane 16. The actuator 10 can include a first conduit 20 with a chamber end 46, or orifice, and a first opening 22 adjacent the aerodynamic surface 24 of the airfoil 14. In the embodiment of FIG. 5 the first opening 22 is shown as an elongated rectangular slot; however, in other embodiments the first opening 22 may have any suitable shape in accordance with the requirements of the particular application. Additionally, the actuator can include a rotating shaft 50 with a crank 52 connected to a connecting rod 54. In FIG. 5, the connecting rod is shown connected to a linkage arm 66, which is fixedly coupled to the pivot 34; nevertheless, in other embodiments the connecting rod 54 may be connected to the vane 16 by any suitable linkage or coupling, such as a shaft at an offset distance along the edge of the vane 16, or the connecting rod 54 may not be required.

Figure 6:
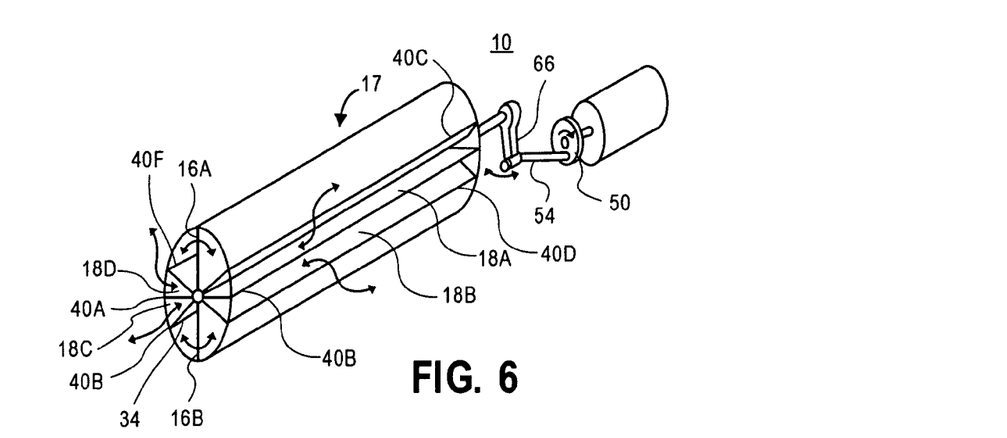
FIG. 6 is a perspective view of a quad-ported, cylindrical, oscillating vane actuator according to another embodiment.

FIG. 6 is a perspective view of a quad-ported, cylindrical, oscillating vane actuator 10 according to another embodiment. As shown in FIG. 6, the oscillating vane actuator 10 includes four wedge-shaped chamber 18a-18d that are defined by a pair of vanes 16a and 16b radiating outwardly from the central pivot 34 and a pair of interior walls 40*a* and 40*b* that radiate inwardly from the substantially cylindrical casing 17. The oscillating vane actuator 10 further includes an actuator or motor 49. The motor 49 may include any suitable actuating device such as, for example, an electric or pneumatic motor or the like. The motor 49 is configured to urge the rotating shaft 50 to rotate and, thereby urge the connecting rod 54 and linkage arm 66 to oscillate the central pivot 34. In this manner, the vanes 16*a* and 16*b* are controlled to rotate towards and away from the walls 40*a* and 40*b* to draw in and expel a volume of fluid from each of the chambers 18*a*-18*d*.

It is an advantage of at least this embodiment that forces upon the components of the oscillating vane actuator 10 are relatively balanced. For example, bending moments on the pivot 34 or central shaft in between bearings is reduced or nulled due to the counterbalancing pressure forces on the opposing vanes 16*a* and 16*b*. In addition, the essentially balanced configuration of the embodiment of FIG. 6 reduces vibration.

Also shown in FIG. 6, the oscillating vane actuator 10 optionally includes perforated or fenestrated walls 40*c*-40*f*. If included, the perforated walls 40*c*-40*f* may provide support to the walls 40*a* and 40*b* while allowing fluid to pass therethrough with minimal pressure loss. The perforated walls 40*c*-40*f* may include panels with a multitude of holes formed therein, mesh, or other such permeable or semi-permeable material.

Figure 7:
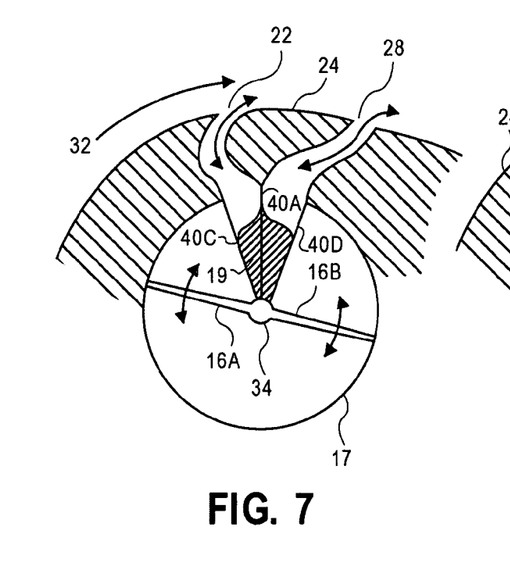
FIG. 7 is a side view of a dual-ported, cylindrical, oscillating vane actuator according to another embodiment.

FIG. 7 is a side view of a dual-ported, cylindrical, oscillating vane actuator 10 according to another embodiment. The oscillating vane actuator 10 according to the embodiment of FIG. 7 is similar to the embodiment shown in FIG. 6 and thus, for the sake of brevity, elements described in FIG. 6 will not be described again in FIG. 7. As shown in FIG. 7, the oscillating vane actuator 10 includes dual ports 22 and 28. In a manner similar to the embodiment of FIG. 6, the vanes 16*a* and 16*b* radiate outwardly from the pivot 34 to generate a balanced structure that reduces vibration and internal scrubbing due to shaft bending. In addition, a plug 19 may be disposed within the casing 17 to the sides of the dividing wall 40*a* to reduce the inactive volume of fluid inside the actuator, improving volumetric efficiency.

Figure 8:
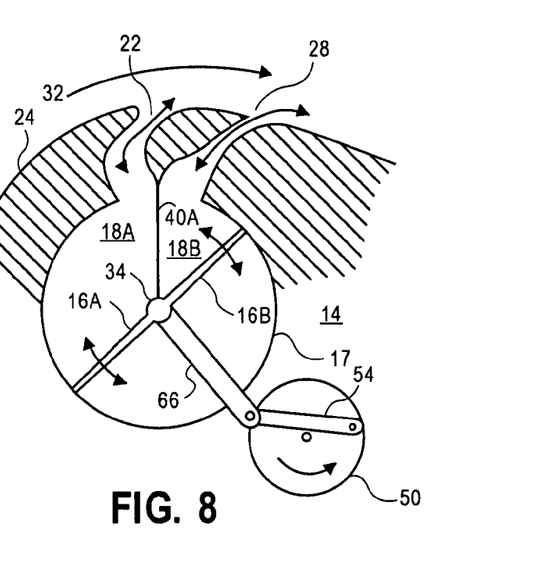
FIG. 8 is a side view of a dual-ported, cylindrical, oscillating vane actuator according to another embodiment.

FIG. 8 is a side view of a dual-ported, cylindrical, oscillating vane actuator according to another embodiment. The oscillating vane actuator 10 according to the embodiment of FIG. 8 is similar to the embodiment shown in FIGS. 6 and 7 and thus, for the sake of brevity, elements described in FIGS. 6 and 7 will not be described again in FIG. 8. As shown in FIG. 8, the oscillating vane actuator 10 does not include the optional walls 40*c* and 40*d*. In this manner, fluid may flow though the chambers 18*a* and 18*b* virtually unfiltered and/or unimpeded. In addition, a portion of the casing 17 may be open to the environment within the airfoil 14. For example, the portion of the casing 17 may be open to reduce the height of the casing 17 or, as shown in FIG. 8, to provide clearance for the linkage arm 66 to swing and thereby oscillate the vanes 16*a* and 16*b*.

Figure 9:
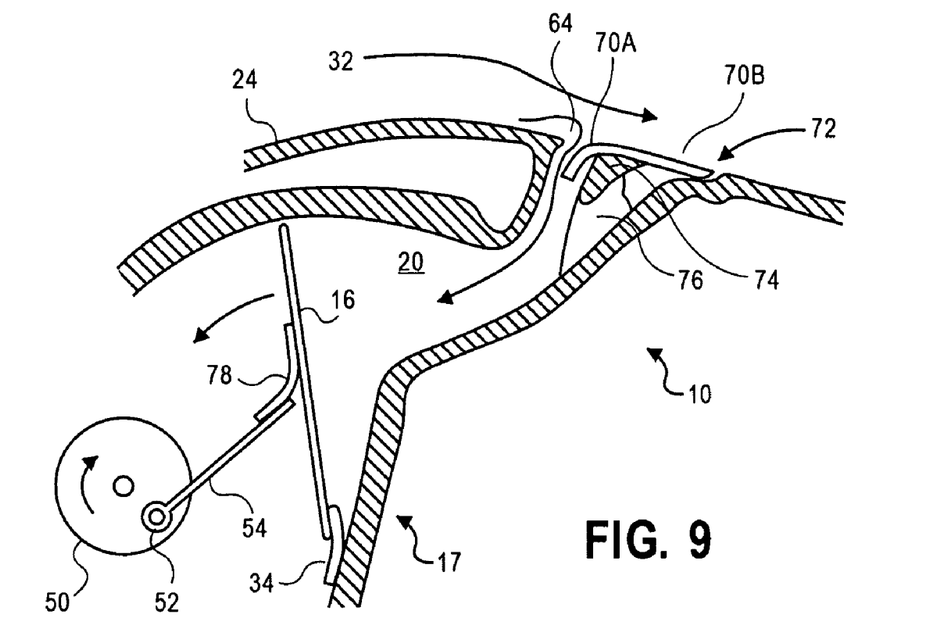
FIG. 9 is a cross-section detail view of a single-ported oscillating vane actuator and port valves in a fluid intake configuration according to another embodiment.
Figure 10:
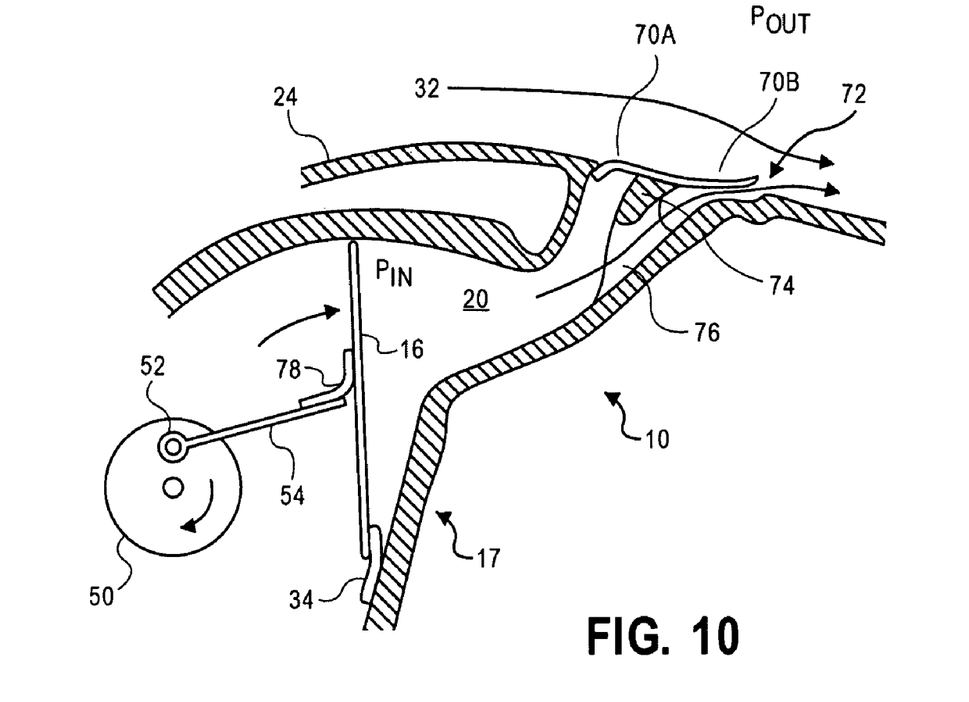
FIG. 10 is a cross-section detail view of a single-ported oscillating vane actuator and port valves in a fluid output configuration according to the embodiment of FIG. 9.

FIG. 9 is a cross-section detail view of a single-ported oscillating vane actuator and port valves in a fluid intake configuration according to another embodiment. The oscillating vane actuator 10 according to the embodiment of FIG. 9 is similar to the embodiment shown in FIG. 4 and thus, for the sake of brevity, elements described in FIG. 4 will not be described again in FIG. 9. As shown in FIG. 9, the oscillating vane actuator 10 includes elastomers or elastomeric hinges 34 and 78 that functionally replace the bearings of the pivot 34 and the lug 68. The elastomeric hinges 34 and 78 may include any suitable elastic or flexible material such as, for example, metals, plastics, and the like. Additionally, the oscillating vane actuator 10 may include a pair of one-way valves 70*a* and 70*b* that function cooperatively to regulate the flow of fluid. For example, the one-way valve 70*a* allows for the inflow of fluid as shown in FIG. 9 and the one-way valve 70*b* allows for the outflow of fluid as shown in FIG. 10. The one-way valves 70*a* and 70*b* are positioned or retained by a valve retainer 74 that is located within the conduit 20 by a support vane 76. The lengthwise periodic support vane 76 acts to support the valve retainer 74 without discernibly retarding the flow of fluid through the conduit 20. The valve configuration may differ, depending on the application and these alterations are within the scope of the invention.

FIG. 10 is a cross-section detail view of a single-ported oscillating vane actuator and port valves in a fluid output configuration according to the embodiment of FIG. 9. The oscillating vane actuator 10 according to the embodiment of FIG. 10 is similar to the embodiment shown in FIGS. 4 and 9 and thus, for the sake of brevity, elements described in FIGS. 4 and 9 will not be described again in FIG. 10. It is an advantage of the embodiment of FIGS. 9 and 10 that the one-way valve 70*b* is configured to prevent the outward flow of relatively slow or relatively low pressure fluid into the fluid stream 32. For example, fluid pressure within the conduit 20 ("$P_{in}$") is configured to urge the one-way valve 70*b* open and fluid pressure of the fluid stream 32 ("$P_{out}$") is configured to urge the one-way valve 70*b* closed. In addition, characteristics of the one-way valve 70*b* such as, for example, material properties, shape, and the like, may "pre-load" the one-way valve 70*b* to open or close to a greater or lesser extent. In a particular example, the one-way valve 70*b* may include a substantially flat elastomeric or resilient material that is deformed to allow the passage of fluid therethrough. The material properties of the material may be configured to urge or may be pre-loaded to close the one-way valve 70*b*

As such, the one-way valve 70*b* remains essentially closed until the $P_{in}$ exceeds the $P_{out}$ by the pre-load. Therefore, the fluid exiting the one-way valve 70*b* is at a relatively higher pressure and/or a higher relative velocity than the fluid stream 32. It has been determined that if lower velocity fluid, relative to the fluid stream 32, is injected into the fluid stream 32, it may reduce adhesion of the fluid stream 32 to the aerodynamic surface 24. It has further been determined that if higher velocity fluid, relative to the fluid stream 32, is injected into the fluid stream 32, it may increase adhesion of the fluid stream 32 to the aerodynamic surface 24. By configuring a variety of factors, some or all of the fluid exiting the one-way valve and entering the stream of fluid 32 may be at a relatively higher velocity than the stream of fluid 32. These factors may include one or more of the following: volume of fluid being displaced by the vane 16; stroke frequency of the vane 16; pre-load of the one-way valve 70*b*; cross-sectional area of the exit orifice; velocity of the fluid stream 32; empirical data; and the like.

Figure 11:
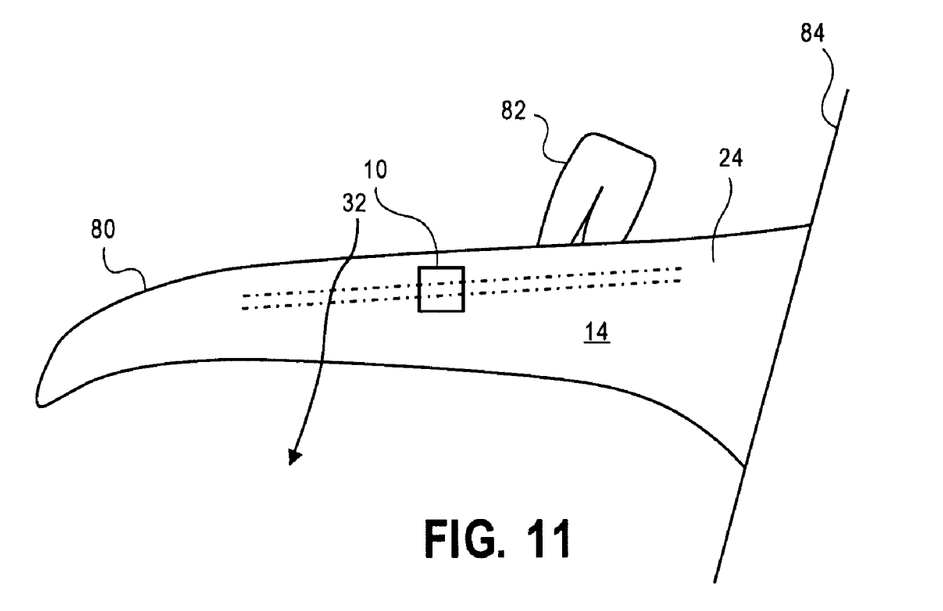
FIG. 11 is a top view of an aerodynamic surface suitable for use with the embodiments of FIGS. 1 to 10.

FIG. 11 is a top view of the aerodynamic surface 24 suitable for use with the embodiments of FIGS. 1 to 10. As shown in FIG. 11, the oscillating vane actuator 10 may be arranged roughly perpendicularly with respect to the stream of fluid 32. The airfoil 14 includes a wing 80. The wing 80 may include an engine 82 such as, for example, a turbine or turboprop or the like. In a preferred form, the wing 80 may be affixed to a fuselage 84.

Figure 12:
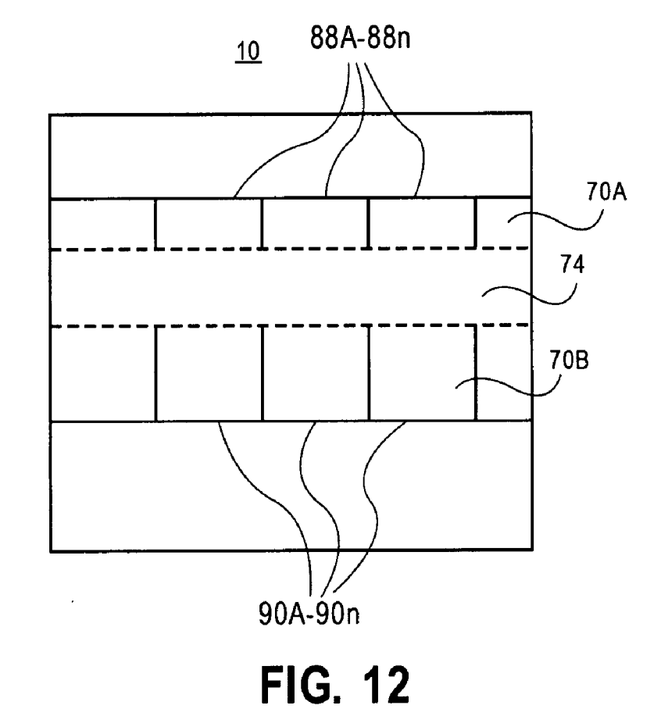
FIG. 12 is a detailed top view of inlet and outlet ports suitable for use with the embodiments of FIGS. 1 to 11.

FIG. 12 is a detailed top view of the inlet port 70a and outlet port 70b suitable for use with the embodiments of FIGS. 1 to 11. As shown in FIG. 12, the oscillating vane actuator 10 may include a plurality of inlet one-way valve segments 88a-88n and a plurality of outlet one-way valve segments 90a-90n that may be arranged roughly spanwise along the wing 80. The arrangement of the segments 88a-88n and 90a-90n facilitates flexing along the axis of the wing 14.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An actuator for displacing a fluid to alter flow characteristics near a surface, the actuator comprising:
   a pivot;
   a plurality of vanes, each vane of the plurality of vanes extending outwardly from the pivot, the plurality of vanes being substantially in balance with respect to the pivot, the plurality of vanes being configured to displace the fluid, a first vane of the plurality of vanes having a first face and a second face;
   a casing configured to at least partially surround the plurality of vanes;
   a plurality of walls extending inwardly from the casing towards the pivot, a first wall of the plurality of walls facing the first face, a second wall of the plurality of walls facing the second face;
   a first orifice that opens into the casing between the first wall and the first face; and
   a second orifice that opens into the casing between the second wall and the second face, wherein the fluid is expelled from the first orifice and drawn into the second orifice in response to the first vane moving toward the first wall, and the fluid is drawn into the first orifice and expelled from the second orifice in response to the first vane moving toward the second wall.

2. The actuator according to claim 1, further comprising:
   a first outlet in fluid communication with the first orifice and a fluid stream flowing near the surface; and
   an outlet valve, the outlet valve being configured to facilitate a flow of the fluid into the fluid stream in response to a fluid pressure inside the valve being relatively greater than a fluid pressure outside the valve.

3. The actuator according to claim 2, wherein the outlet valve includes a preload and the outlet valve is configured to facilitate the flow of the fluid into the fluid stream in response to the fluid pressure inside the valve being relatively greater than the preload plus the fluid pressure outside the valve.

4. The actuator according to claim 2, wherein the first outlet is configured to direct the flow of the fluid generally toward a direction of flow of the fluid stream.

5. The actuator according to claim 2, further comprising:
   an aircraft wing having a longitudinal axis configured to extend roughly perpendicularly relative to the flow of the fluid stream, the outlet valve disposed along a portion of the longitudinal axis, the outlet valve including a plurality segments configured to facilitate operation of the outlet valve during flexing of the wing.

6. The actuator according to claim 1, wherein the plurality of vanes and the casing are further configured to have a substantially fluid-tight clearance between a perimeter of the plurality of vanes and an inner wall of the casing.

7. The actuator according to claim 1, wherein the casing and the plurality of walls define a plurality of internal wedge-shaped chambers.

8. The actuator according to claim 7, wherein in response to rotation of the pivot the plurality of vanes rotate within respective chambers of the plurality of internal wedge-shaped chambers in an arc about the pivot.

9. An actuator for displacing a fluid to alter flow characteristics near a surface, the actuator comprising:
   a cylindrical casing having a central axis;
   a wall extending radially inwardly from the cylindrical casing towards the central axis;
   a pair of ports flanking respective sides of the wall, each of the ports providing a fluid path through the cylindrical casing; and
   a plurality of vanes extending radially outwardly from the central axis towards the cylindrical casing, wherein the fluid is urged to flow in to the cylindrical casing through a first port of the pair of ports and the fluid is urged to flow out of the cylindrical casing through a second port of the pair of ports in response to rotating the plurality of vanes in a first direction.

10. The actuator according to claim 9, wherein the fluid is urged to flow out of the cylindrical casing through the first port and the fluid is urged to flow in to the cylindrical casing through the second port in response to rotating the plurality of vanes in a second direction.

11. The actuator according to claim 9, further comprising:
    a first outlet in fluid communication with the first port and a fluid stream flowing near the surface; and
    an outlet valve, the outlet valve being configured to facilitate a flow of the fluid into the fluid stream in response to a fluid pressure inside the valve being relatively greater than a fluid pressure outside the valve.

12. The actuator according to claim 11, wherein the outlet valve includes a preload and the outlet valve is configured to facilitate the flow of the fluid into the fluid stream in response to the fluid pressure inside the valve being relatively greater than the preload plus the fluid pressure outside the valve.

13. The actuator according to claim 11, wherein the first outlet is configured to direct the flow of the fluid generally toward a direction of flow of the fluid stream.

14. The actuator according to claim 11, further comprising:
    an aircraft wing having a longitudinal axis configured to extend roughly perpendicularly relative to the flow of the fluid stream, the outlet valve disposed along a portion of the longitudinal axis, the outlet valve including a plurality segments configured to facilitate operation of the outlet valve during flexing of the wing.

15. The actuator according to claim 9, wherein the plurality of vanes and the casing are further configured to have a substantially fluid-tight clearance between a perimeter of the plurality of vanes and an inner wall of the casing.

16. The actuator according to claim 9, further comprising:
    a plurality of walls extending radially inwardly from the cylindrical casing towards the central axis;
    a respective plurality of additional pairs of ports associated with each of the plurality of walls; and a respective plurality of additional vanes associated with each of the walls, wherein the casing and the plurality of walls define a plurality of internal wedge-shaped chambers.

17. The actuator according to claim 16, wherein in response to rotation of the central axis the plurality of vanes rotate within respective chambers of the plurality of internal wedge-shaped chambers in an arc about the central axis.

18. An apparatus for displacing a fluid to alter flow characteristics near a surface, the apparatus comprising:
means for displacing the fluid using a plurality of vanes rotating about a central shaft in a cylindrical casing configured to at least partially surround the vane;
means for conveying the fluid out from a first side of the casing and expelling the fluid into a fluid stream adjacent the surface in response to rotation of the shaft in a first direction; and
means for drawing the fluid from the fluid stream and conveying the fluid into the first side of the casing in response to rotation of the shaft in a second direction.

19. The apparatus according to claim 18, further comprising:
means for expelling the fluid into the fluid stream in response to a pressure inside the cylindrical casing being relatively greater than a pressure near the surface.

20. The apparatus according to claim 18, further comprising:
means for conveying the fluid out from the second side of the casing and expelling the fluid into the fluid stream in response to rotation of the shaft in the second direction; and
means for drawing the fluid from the fluid stream and conveying the fluid into the second side of the casing in response to rotation of the shaft in the first direction.

21. The apparatus according to claim 18, wherein the means for expelling the fluid generally expels the fluid toward a direction of the flow of the fluid stream.

22. An apparatus for displacing a fluid to alter flow characteristics of a fluid stream near a surface, the apparatus comprising:
means for rotating a plurality of vanes about a shaft in a cylindrical casing, the casing including a first side and a second side, the first side being in fluid connection with a first orifice, the second side being in fluid connection with a second orifice, the first orifice and the second orifice being in fluid connection with the fluid stream;
means for drawing the fluid from the fluid stream via the first orifice and expelling the fluid into the fluid stream via the second orifice in response to rotating the shaft in a first direction; and
means for expelling the fluid into the fluid stream via the first orifice and drawing the fluid from the fluid stream via the second orifice in response to rotating the shaft in a second direction.

23. The apparatus according to claim 22, further comprising:
means for expelling the fluid into the fluid stream in response to a pressure inside the cylindrical casing being relatively greater than a pressure near the surface.

24. The apparatus according to claim 22, further comprising:
means for expelling the fluid from the first orifice generally toward a direction the fluid stream is flowing; and
means for expelling the fluid from the second orifice generally toward a direction the fluid stream is flowing.

25. The apparatus according to claim 22, further comprising:
means for expelling the fluid from the first orifice into the fluid stream at a higher velocity relative to a velocity of the fluid stream; and
means for expelling the fluid from the second orifice into the fluid stream at a higher velocity relative to the velocity of the fluid stream.

26. A method of displacing a fluid to alter flow characteristics near a surface, comprising:
displacing the fluid using a plurality of vanes rotating about a central shaft in a cylindrical casing configured to at least partially surround the vane;
conveying the fluid out from a first side of the casing and expelling the fluid into a fluid stream adjacent the surface in response to rotation of the shaft in a first direction; and
drawing the fluid from the fluid stream and conveying the fluid into the first side of the casing in response to rotation of the shaft in a second direction.

27. The method according to claim 26, further comprising:
expelling the fluid into the fluid stream in response to a pressure inside the cylindrical casing being relatively greater than a pressure near the surface.

28. The method according to claim 26, further comprising:
conveying the fluid out from the second side of the casing and expelling the fluid into the fluid stream in response to rotation of the shaft in the second direction; and
drawing the fluid from the fluid stream and conveying the fluid into the second side of the casing in response to rotation of the shaft in the first direction.

29. The method according to claim 26, wherein the fluid is expelled generally toward a direction of the flow of the fluid stream.

30. A method of displacing a fluid to alter flow characteristics of a fluid stream near a surface, the method comprising:
rotationally oscillating a plurality of vanes about a shaft in a cylindrical casing, the casing including a first side and a second side, the first side being in fluid connection with a first orifice, the second side being in fluid connection with a second orifice, the first orifice and the second orifice being in fluid connection with the fluid stream;
drawing the fluid from the fluid stream via the first orifice and expelling the fluid into the fluid stream via the second orifice in response to rotating the shaft in a first direction; and
expelling the fluid into the fluid stream via the first orifice and drawing the fluid from the fluid stream via the second orifice in response to rotating the shaft in a second direction.

31. The method according to claim 30, further comprising:
expelling the fluid into the fluid stream in response to a pressure inside the cylindrical casing being relatively greater than a pressure near the surface.

32. The method according to claim 30, further comprising:
expelling the fluid from the first orifice generally toward a direction the fluid stream is flowing; and
expelling the fluid from the second orifice generally toward a direction the fluid stream is flowing.

33. The method according to claim 30, further comprising:
- expelling the fluid from the first orifice into the fluid stream at a higher velocity relative to a velocity of the fluid stream; and
- expelling the fluid from the second orifice into the fluid stream at a higher velocity relative to the velocity of the fluid stream.

34. An actuator for displacing a fluid to alter flow characteristics near a surface, the actuator comprising:
- a vane configured to displace the fluid, the vane having a first face and a second face;
- a casing configured to at least partially surround the vane, the casing having a first side toward the first face of the vane; and
- a first orifice that opens into the casing from the first side of the casing, wherein the fluid is expelled from the first orifice when the first face of the vane travels toward the first side of the casing, and the fluid is drawn into the first orifice when the first face of the vane travels away from the first side of the casing.

35. The actuator according to claim 34, further comprising:
- a first edge of the vane flexibly secured to the casing; and
- a second edge of the vane to travel in an arc defined by a radius having a length of the vane and pivot at the first edge.

36. The actuator according to claim 34, further comprising:
- a linkage arm flexibly secured to the second face of the vane, the linkage arm being configured to urge the first face of the vane towards the first side of the casing and the linkage arm being configured to urge the first face of the vane away from the first side of the casing.

37. An actuator for displacing a fluid to alter flow characteristics near a surface, comprising:
- displacing means for displacing the fluid;
- casing means for at least partially surrounding the displacing means, the casing means having a first side; and
- porting means for intake and output of the fluid to the first side of the surrounding means, wherein the fluid is expelled from the casing means via the porting means in response to the displacing means being urged toward the first side of the casing means and the fluid is drawn into the casing means via the porting means in response to the displacing means being urged away from the first side of the casing means.

38. The actuator according to claim 37, further comprising:
- a first edging means of the displacing means being flexibly secured to the casing means; and
- a second edging means of the displacing means to travel in an arc defined by a radius having a length of the displacing means and pivot at the first edging means.

39. The actuator according to claim 37, further comprising:
- a linking means flexibly secured to the displacing means, the linking means being configured to urge the displacing means towards the first side of the casing means and the linking means being configured to urge the displacing means away from the first side of the casing means.

* * * * *